United States Patent Office 2,843,591
Patented July 15, 1958

2,843,591

2-HYDROXY-BENZOQUINOLIZINES AND METHOD FOR PREPARING SAME

Arnold Brossi, Otto Schnider, and Max Walter, Basel, Switzerland, assignors to Hoffmann-La Roche Inc., Nutley, N. J., a corporation of New Jersey No Drawing. Application February 4, 1957
Serial No. 637,882

Claims priority, application Switzerland February 8, 1956

5 Claims. (Cl. 260—286)

The present invention relates to 2-hydroxy-benzo[a]quinolizines, addition salts thereof with therapeutically acceptable acids, and a method for preparing same. The 2-hydroxy-benzo[a]quinolizines and the acid addition salts thereof according to this invention are useful as therapeutic agents and as intermediates in the synthesis of other medicaments.

The 2-hydroxy-benzo[a]quinolizines of this invention are compounds having the general formula

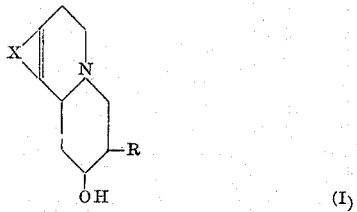

wherein X represents a divalent radical selected from the group consisting of butadien-1,4-ylene, dihydroxy-butadien-1,4-ylene, di(lower alkoxy)-butadien-1,4-ylene, (lower alkylendioxy)-butadien-1,4-ylene and 1,4-butylene radicals, and R represent a member selected from the group consisting of alkyl, alkenyl, acyclic alkoxyalkyl, cyclic alkoxyalkyl and aralkyl radicals.

The addition salts of the compounds of Formula I with therapeutically acceptable organic and inorganic acids are also comprised within the scope of the present invention.

The process according to this invention comprises reducing a compound having the general formula

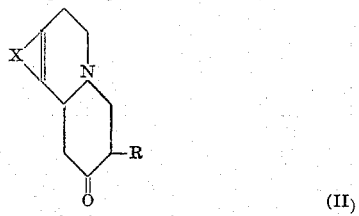

wherein X represents a divalent radical selected from the group consisting of butadien-1,4-ylene, dihydroxy-butadien-1,4-ylene, di(lower alkoxy)-butadien-1,4-ylene, (lower alkylendioxy)-butadien-1,4-ylene and 1,4-butylene radicals, and R represents a member selected from the group consisting of alkyl, alkenyl, acyclic alkoxyalkyl, cyclic alkoxyalkyl and aralkyl radicals.

In the above Formulae I and II the symbol X can represent, for instance, a di(lower alkoxy)-butadien-1,4-ylene radical, e. g. a dimethoxy-, diethoxy-, di-n-propoxy- or di-n-butoxy-butadien-1,4-ylene radical, or a (lower alkylendioxy)-butadien-1,4-ylene radical, e. g. a methylendioxy-butadien-1,4-ylene radical. The symbol R in the above Formulae I and II can represent, for instance, a lower alkyl radical, e. g. methyl, ethyl, n-butyl, isobutyl, n-amyl, n-hexyl, etc.; a lower alkenyl radical, e. g. allyl, etc.; a lower acyclic alkoxyalkyl radical, e. g. ω-methoxy-n-butyl, etc.; a lower cyclic alkoxyalkyl radical, e. g. tetrahydrofurfuryl; or an ar(lower alkyl) radical, e. g. benzyl, etc.

A preferred class of 2-hydroxy-benzo[a]quinolizines of this invention comprises those compounds of Formula I wherein X is a 2,3-di(lower alkoxy)-butadien-1,4-ylene radical.

The starting compounds of Formula II can be prepared, for instance, by condensing a correspondingly substituted 1 - (carbalkoxy - methyl) - 1,2,3,4 - tetrahydro - isoquinoline with formaldehyde and a malonic acid carrying the desired substituent R, or the dimethyl ester of such a malonic acid, by means of a Mannich reaction, esterifying any free carboxyl groups in the resulting condensation product, subjecting the resulting tricarboxylic acid ester to an intramolecular condensation by means of an alkaline condensing agent according to Dieckmann, and saponifying and decarboxylating the resulting condensation product. A more detailed description of a suitable method for preparing the starting compounds of Formula II is given in Example 1 of the present specification.

The reduction of the 1-oxo group of the starting compounds of Formula II to a hydroxy group can be brought about by known methods.

Thus, the reduction can be carried out, for instance, by catalytic hydrogenation, conveniently in the presence of a solvent, such as methanol or glacial acetic acid, for instance by means of a pre-hydrogenated platinum oxide catalyst, at room temperature. If Raney nickel is used as the catalyst, it is advisable to effect the hydrogenation at elevated temperature and under pressure, also in the presence of a solvent, such as methanol. If the substituent R is an unsaturated radical, the catalytic hydrogenation of the oxo group to the hydroxy group results in the simultaneous formation of a saturated R radical. The catalytic hydrogenation is also particularly suitable in those cases where X represents a dihydroxy-butadien-1,4-ylene radical.

A further mode of execution of the present process consists in effecting the reduction by means of alkali metals and alcohols. This method is particularly suitable in those cases where X in Formula II is a butadien-1,4-ylene, dialkoxy butadien-1,4-ylene, alkylendioxy-butadien-1,4-ylene or 1,4-butylene radical. In this mode it is convenient to dissolve the starting 2-oxo-benzo[a]quinolizine in an alcohol such as, e. g., n-butanol, and to add the alkali metal, e. g. metallic sodium, to the boiling solution.

Furthermore, the reduction can also be brought about by means of alkali metal hydrides such as, e. g., lithium aluminium hydride, particularly in those cases where X in Formula II is a butadien-1,4-ylene, dialkoxy-butadien-1,4-ylene, alkylendioxy-butadien-1,4-ylene or 1,4-butylene radical. In this mode it is convenient to carry out the reaction in the presence of a solvent such as, e. g., absolute ether, or of a solvent mixture such as, e. g., a mixture of absolute ether and dioxane, and to reflux the reaction mixture.

The 2-hydroxy-benzo[a]quinolizines formed can be dissolved by concentrating the reduction mixture and adding mineral acid to the residue. The free bases can be precipitated by adding alkali until the mixture is alkaline to litmus. The free bases are crystalline substances which are difficultly soluble in water. They form water-soluble salts with the usual inorganic and organic acids, e. g. hydrochloric acid, hydrobromic acid, phosphoric acid, sulfuric acid, tartaric acid, citric acid, etc.

The reduction according to the present invention results in sterically uniform products. The free bases as well as their addition salts with therapeutically acceptable acids have blood pressure-reducing, sedative, analgesic, antipyretic and inflammation-inhibiting properties. They are intended to be used as medicaments and as intermediates in the synthesis of medicaments.

The invention will be illustrated in detail in the following examples without being limited thereto.

Example 1

293 g. of 2-oxo-3-ethyl-9,10-dimethoxy-1,2,3,4,6,7-hexahydro-benzo[a]quinolizine were dissolved in 6000 ml. of glacial acetic acid, and the solution was hydrogenated in the presence of 2 g. of pre-hydrogenated platinum oxide catalyst at room temperature until the calculated amount of hydrogen had been absorbed. The catalyst was removed by filtration, the filtrate was concentrated in vacuo, the residue was dissolved in water, and the solution was made alkaline to phenolphthalein by the addition of 3 N ammonia solution. The precipitated basic products were crystallized by taking them up in benzene, concentrating the solution and adding ethyl acetate. After reprecipitation from ethyl acetate and petroleum ether the 2-hydroxy-3-ethyl-9,10-dimethoxy-1,2,3,4,6,7-hexahydrobenzo[a]quinolizine crystallized in the form of colourless needles of M. P. 151–152° C. Hydrobromide: M. P. 231–233° C. Acid sulfate: M. P. 259–260° C. Hydrochloride: M. P. 225–227° C.

The 2-oxo-3-ethyl-9,10-dimethoxy-1,2,3,4,6,7-hexahydro-benzo[a]quinolizine used as starting compound in this example can be prepared, for instance, as follows:
280 g. of 1-carbethoxymethyl-6,7-dimethoxy-1,2,3,4-tetrahydroisoquinoline (which may be obtained, for instance, by the method described in J. Chem. Soc. London 1951, 3464; and ibidem 1953, 2463), 35 g. of paraformaldehyde and 160 g. of dimethyl mono-ethyl-malonate were suspended in 1000 ml. of methanol, and the suspension was refluxed for 24 hours. The 1-carbethoxymethyl-2-(2′,2′-dicarbomethoxy-n-butyl) - 6,7 - dimethoxy-1,2,3,4-tetrahydroisoquinoline which crystallised out on cooling melted at 118–120° C., after recrystallisation from methanol.

28 g. of sodium were dissolved in 650 ml. of absolute ethanol, and the solution was then concentrated to dryness. 3600 ml. of toluene and 451 g. of 1-carbethoxymethyl-2-(2′,2′-dicarbomethoxy-n-butyl) - 6,7 - dimethoxy-1,2,3,4-tetrahydroisoquinoline were added to the residue. The reaction mixture was heated and the alcohol formed in the reaction distilled off until the boiling point of toluene was reached. Then the reaction mixture was refluxed for further two hours and subsequently concentrated to dryness. The residue was dissolved in 5200 ml. of 3 N hydrochloric acid and heated for 14 hours at a bath temperature of 120° C. to cause saponification and decarboxylation. The reaction mixture was allowed to cool, then washed with ether, decolorised with activated carbon, made alkaline and then taken up in ether. After recrystallisation from di-n-butyl ether the so-obtained 2-oxo-3-ethyl-9,10-dimethoxy-1,2,3,4,6,7-hexahydro-benzo[a]quinolizine melted at 110–112° C. Hydrochloride: M. P. 198–200° C.; hydrobromide: M. P. 218° C.

Example 2

293 g. of 2-oxo-3-ethyl-9,10-dimethoxy-1,2,3,4,6,7-hexahydro-benzo[a]quinolizine were dissolved in 5000 ml. of a mixture of absolute dioxane and absolute ether (volume ratio 1:4), to the resulting solution were added 50 g. of powdered lithium aluminium hydride, and the mixture was refluxed for 4 hours. The complex compound formed and the excess lithium aluminium hydride were hydrolyzed with water, the reaction mixture was extracted with a mixture of equal volumes of benzene and n-butanol, and the residue obtained by concentration of the solvent mixture was crystallized from isopropyl ether and finally reprecipitated from ethyl acetate-petroleum ether. The resulting 2-hydroxy-3-ethyl-9,10-dimethoxy - 1,2,3,4,6,7 - hexahydro-benzo[a]quinolizine crystallized in the form of colourless needles of M. P. 151–152° C. The base and the salts obtained therefrom were identical with the compounds obtained according to Example 1.

Example 3

293 g. of 2-oxo-3-ethyl-9,10-dimethoxy-1,2,3,4,6,7-hexahydro-benzo[a]quinolizine were dissolved in 12,000 ml. of n-butanol, while heating, and to the boiling solution was added portionwise a total of 580 g. of metallic sodium. After the sodium had been completely added, the reaction mixture was further refluxed for 1 hour, then made acid to litmus by the addition of dilute hydrochloric acid, and the n-butanol was removed by distillation in vacuo. The residue was taken up in water, and to the solution was added 3 N ammonia solution until it was alkaline to phenolphthalein. The precipitated base was then taken up in benzene. The residue obtained by concentrating the benzene solution was crystallised from ethyl acetate, and the resulting 2-hydroxy-3-ethyl-9,10 - dimethoxy - 1,2,3,4,6,7 - hexahydro-benzo[a]quinolizine was reprecipitated from ethyl acetate-petroleum ether. Colourless needles of M. P. 151–152° C. were obtained. The base and the salts obtained therefrom were identical with the compounds obtained according to Example 1 or 2.

Example 4

293 g. of 2-oxo-3-ethyl-9,10-dimethoxy-1,2,3,4,6,7-hexahydro-benzo[a]quinolizine were dissolved in 5000 ml. of methanol, and the resulting solution was hydrogenated in the presence of 100 g. of Raney nickel for 12 hours at 50° C. and at a hydrogen pressure of 50 atmospheres. The catalyst was removed by filtration, the filtrate was concentrated, and the crystalline residue was reprecipitated from ethyl acetate-petroleum ether. The 2 - hydroxy - 3 - ethyl - 9,10 - dimethoxy - 1,2,3,4,6,7-hexahydro-benzo[a]quinolizine crystallized in the form of colourless needles of M. P. 151–152° C. The base and the salts obtainable therefrom were identical with the compounds obtained according to Example 1, 2 or 3.

Example 5

354 g. of 2-oxo-3-n-butyl-9,10-dimethoxy-1,2,3,4,6,7-hexahydro-benzo[a]quinolizine hydrochloride were dissolved in 3000 ml. of methanol, and the solution was hydrogenated in the presence of 3 g. of pre-hydrogenated platinum oxide catalyst at room temperature until the calculated amount of hydrogen had been absorbed. The catalyst was removed by filtration, the filtrate was concentrated to dryness, the residue was dissolved in a small amount of hot methanol, and ether was added to the solution until it became turbid. The precipitated hydrochloride of 2-hydroxy-3-n-butyl-9,10-dimethoxy-1,2,3,4,6,7-hexahydro-benzo[a]quinolizine melted at 226–228° C., after reprecipitation from methanol-ether. On addition of sodium bicarbonate solution to the aqueous solution of the hydrochloride until it became alkaline to litmus, the base precipitated and crystallized after standing for a while. The base was dried and reprecipitated from ethyl acetate-petroleum ether. Colourless platelets of M. P. 126–128° C. were obtained. Hydrobromide: M. P. 230–232° C.

Example 6

317 g. of 2-oxo-3-n-butyl-9,10-dimethoxy-1,2,3,4,6,7-hexahydro-benzo[a]quinolizine were dissolved in 12,000 ml. of absolute ether, and 50 g. of powdered lithium aluminum hydride were added portionwise to the solution. When the addition was completed, the mixture was refluxed for 4 hours, the resulting complex compound and the excess lithium aluminium hydride were hydrolyzed by the addition of water, the ether solution was decanted, dried over sodium sulfate and concentrated. The resulting residue consisting of 2-hydroxy-3-n-butyl-9,10-dimethoxy-1,2,3,4,6,7-hexahydrobenzo[a]quinolizine was crystallized by the addition of ethyl acetate and finally reprecipitated from ethyl acetate-petroleum ether. Colourless platelets of M. P. 126–128° C. were obtained. The base and the salts obtainable therefrom were identical with the compounds obtained according to Example 5.

Example 7

217 g. of 2-oxo-3-n-butyl-9,10-dimethoxy-1,2,3,4,6,7-hexahydro-benzo[a]quinolizine were dissolved in 3000 ml. of glacial acetic acid, and the solution was hydrogenated at room temperature in the presence of 3 g. of pre-hydrogenated platinum oxide catalyst until the calculated amount of hydrogen had been absorbed. The catalyst was removed by filtration, the filtrate was concentrated in vacuo, the residue was dissolved in water, the solution was made alkaline to phenolphthalein by the addition of 3 N ammonia solution, and the precipitated base was taken up in benzene. The residue obtained after concentrating the benzene solution was reprecipitated from ethyl acetate-petroleum ether. There was thus obtained 2-hydroxy-3-n-butyl-9,10-dimethoxy-1,2,3,4,6,7-hexahydro-benzo[a]quinolizine in the form of colourless platelets of M. P. 126–128° C. The base as well as the salts obtainable therefrom were identical with the products obtained according to Example 5 or 6.

Example 8

317 g. of 2-oxo-3-n-butyl-9,10-dimethoxy-1,2,3,4,6,7-hexahydro-benzo[a]quinolizine were dissolved in 10,000 ml. of hot n-butanol, and 600 g. of metallic sodium were added portionwise to the boiling solution. Dilute hydrochloric acid was added until the mixture was acid to litmus, and then the n-butanol was removed by distillation. The residue obtained after concentration was dissolved in water, 3 N ammonia solution was added to the solution until it was alkaline to phenol-phthalein, and the separated base was taken up in benzene. The benzene extract was concentrated to obtain the 2-hydroxy-3-n-butyl-9,10-dimethoxy-1,2,3,4,6,7-hexahydro-benzo[a]quinolizine which, after reprecipitation from ethyl acetate-petroleum ether crystallized in the form of colourless platelets of M. P. 126–128° C. The base and the salts obtainable therefrom were identical with the compounds obtained according to Example 5, 6 or 7.

Example 9

The 2-oxo-3-ethyl-9,10-dihydroxy-1,2,3,4,6,7-hexahydro-benzo[a]quinolizine hydrobromide used as starting material in this example was prepared by dissolving 2-oxo-3-ethyl-9,10-dimethoxy-1,2,3,4,6,7-hexahydro-benzo[a]quinolizine or its hydrobromide in 48% hydrobromic acid and refluxing the solution for about 1 hour. The reaction mixture was concentrated to dryness in vacuo, and the residue was dissolved in hot acetone. On cooling the solution, 2-oxo-3-ethyl-9,10-dihydroxy-1,2,3,4,6,7-hexahydro-benzo[a]quinolizine hydrobromide of M. P. 204–205° C. crystallized out M. P. of the free base: 178–179° C.

342 g. of 2-oxo-3-ethyl-9,10-dihydroxy-1,2,3,4,6,7-hexahydro-benzo[a]quinolizine hydrobromide were dissolved in 10,000 ml. of 50% acetic acid, and the solution was hydrogenated at room temperature in the presence of 3 g. of prehydrogenated platinum oxide catalyst until the calculated amount of hydrogen had been absorbed. The catalyst was removed by filtration, the filtrate was concentrated to dryness in the vacuum of a water jet pump, the residue was boiled with acetone, and the crystalline hydrobromide was reprecipitated from alcohol-ether.

The 2,9,10-trihydroxy-3-ethyl-1,2,3,4,6,7-hexahydrobenzo[a]quinolizine hydrobromide melted at 229–231° C. (The same hydrobromide can also be obtained by refluxing 2-hydroxy-3-ethyl-9,10-dimethoxy-1,2,3,4,6,7-hexahydro-benzo[a]quinolizine, obtained according to any of Example 1, 2, 3 or 4, together with 48% hydrobromic acid.)

In an analogous manner—as described in detail in Examples 1 to 4—the following 2-hydroxy-benzo[a]quinolizines can be prepared:

2-hydroxy-3-methyl-9,10-dimethoxy-1,2,3,4,6,7-hexahydro-benzo[a]quinolizine of M. P. 147–148° C.; hydrochloride M. P. 230–232° C.

2-hydroxy-3-allyl-9,10-dimethoxy-1,2,3,4,6,7-hexahydro-benzo[a]quinolizine of M. P. 129–130° C.; hydrobromide: M. P. 210–212° C.

2-hydroxy-3-ethyl-9,10-diethoxy-1,2,3,4,6,7-hexahydro-benzo[a]quinolizine of M. P. 130–131° C.; hydrochloride: M. P. 211–213° C.

2-hydroxy-3-ethyl-9,10-methylendioxy-1,2,3,4,6,7-hexahydro-benzo[a]quinolizine of M. P. 143–144° C.; hydrochloride: M. P. 245–247° C.

2,9,10-trihydroxy-3-n-butyl-1,2,3,4,6,7-hexahydrobenzo[a]quinolizine; hydrobromide: M. P. 251–253° C.

2-hydroxy-3-isobutyl-9,10-dimethoxy-1,2,3,4,6,7-hexahydro-benzo[a]quinolizine of M. P. 168–170° C.; hydrochloride M. P. 206–207° C.

2-hydroxy-3-n-amyl-9,10-dimethoxy-1,2,3,4,6,7-hexahydro-benzo[a]quinolizine of M. P. 127–128° C.; hydrochloride: M. P. 178–179° C.

2-hydroxy-3-benzyl-9,10-dimethoxy-1,2,3,4,6,7-hexahydro-benzo[a]quinolizine of M. P. 177–178° C.; picrate: M. P. 171–172° C.

2-hydroxy-3-tetrahydrofurfuryl-9,10-dimethoxy-1,2,3,4,6,7-hexahydro-benzo[a]quinolizine; hydrobromide: M. P. 208–210° C.

2-hydroxy-3-n-hexyl-9,10-dimethoxy-1,2,3,4,6,7-hexahydro-benzo[a]quinolizine of M. P. 120–121° C.; hydrochloride: M. P. 167–168° C.

2-hydroxy-3-(ω-methoxy-n-butyl)-9,10-dimethoxy-1,2,3,4,6,7-hexahydro-benzo[a]quinolizine; hydrochloride: M. P. 150° C.

2-hydroxy-3-n-butyl-1,2,3,4,6,7,8,9,10,11-decahydro-benzo[a]quinolizine of M. P. 101–102° C.

2-hydroxy-3-ethyl-1,2,3,4,6,7,8,9,10,11-decahydro-benzo[a]quinolizine of M. P. 97–98° C.

We claim:

1. A compound selected from the group consisting of 2-hydroxy-benzo[a]quinolizine bases and therapeutically acceptable acid addition salts thereof, the bases having the general formula

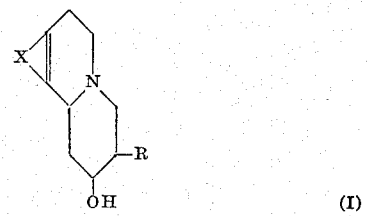

wherein X represents a divalent radical selected from the group consisting of butadien-1,4-ylene, dihydroxy-butadien-1,4-ylene, di(lower alkoxy)-butadien-1,4-ylene, (lower alkylendioxy)-butadien-1,4-ylene and 1,4-butylene radicals, and R represents a member selected from the group consisting of lower alkyl, lower alkenyl, lower acyclic alkoxyalkyl, lower cyclic alkoxyalkyl and lower aralkyl radicals.

2. 2-hydroxy-3-n-butyl-9,10-dimethoxy-1,2,3,4,6,7-hexahydro-benzo[a]quinolizine.

3. 2-hydroxy-3-n-butyl-9,10-dimethoxy-1,2,3,4,6,7-hexahydro-benzo[a]quinolizine hydrobromide.

4. 2-hydroxy-3-lower alkyl-9,10-di(lower alkoxy)-1,2,3,4,6,7-hexahydro-benzo[a]quinolizine.

5. A therapeutically acceptable acid addition salt of a compound according to claim 4.

References Cited in the file of this patent

Jour. Pharm. Soc., Japan, vol. 72, 1952, pp. 248–251.
Jour. Pharm. Soc., Japan, vol. 69, 1949, pp. 85–87.
Jour. Pharm. Soc., Japan, vol. 62, 1942, pp. 77–82.
J. Chem. Soc. (London), 1953, pp. 2463–2470.
Experientia, vol. 6, pp. 378–9.
Karrer: Organic Chemistry, 2nd edition, Elsevier Publ. Co., 1946, page 165 (N. Y.).